United States Patent
Graziosi et al.

(10) Patent No.: US 7,581,692 B2
(45) Date of Patent: Sep. 1, 2009

(54) FLUIDIC CHEVRONS AND CONFIGURABLE THERMAL SHIELD FOR JET NOISE REDUCTION

(75) Inventors: Paolo Graziosi, Clifton Park, NY (US); Kevin Kirtley, Scotia, NY (US); Ramani Mani, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 705 days.

(21) Appl. No.: 10/610,718

(22) Filed: Jun. 30, 2003

(65) Prior Publication Data
US 2004/0262447 A1 Dec. 30, 2004

(51) Int. Cl.
*B64C 1/40* (2006.01)
(52) U.S. Cl. ............ 244/1 N; 60/226.1; 244/53 R
(58) Field of Classification Search ............ 244/1 N, 244/53 R; 60/226.1, 231, 262, 264, 39.58; 181/213, 215, 220; 239/127.1, 127.3, 265.17, 239/265.33, 265.19, 265.23; 415/119
See application file for complete search history.

(56) References Cited

U.S. PATENT DOCUMENTS

| | | | | | |
|---|---|---|---|---|---|
| 2,990,905 | A | * | 7/1961 | Lilley | 181/220 |
| 3,174,282 | A | | 3/1965 | Harrison | |
| 3,527,317 | A | | 9/1970 | Motsinger | 181/35 |
| 3,721,314 | A | * | 3/1973 | Hoch et al. | 181/215 |
| 3,726,091 | A | | 4/1973 | Tontini | 60/264 |
| 4,175,640 | A | * | 11/1979 | Birch et al. | 181/213 |
| 4,214,703 | A | * | 7/1980 | Sorensen et al. | 239/127.3 |
| 4,291,782 | A | | 9/1981 | Klees | 181/215 |
| 4,474,259 | A | * | 10/1984 | Wright | 181/220 |
| 4,516,660 | A | | 5/1985 | Greenlaw | 181/296 |
| 4,934,481 | A | * | 6/1990 | Friedrich | 181/215 |
| 5,402,963 | A | * | 4/1995 | Carey et al. | 244/1 N |
| 5,402,964 | A | | 4/1995 | Wygnanski | 244/1 N |
| 5,428,954 | A | | 7/1995 | Cowan, Sr. | 60/262 |
| 5,485,959 | A | | 1/1996 | Wood et al. | |
| 5,813,625 | A | | 9/1998 | Hassan et al. | 244/17.11 |
| 5,826,794 | A | * | 10/1998 | Rudolph | 239/265.17 |
| 5,947,412 | A | | 9/1999 | Berman | 244/1 N |
| 6,082,635 | A | | 7/2000 | Seiner et al. | 239/265.19 |
| 6,244,817 | B1 | | 6/2001 | Ngo | 415/119 |
| 6,253,540 | B1 | * | 7/2001 | Chew et al. | 60/262 |
| 6,308,898 | B1 | * | 10/2001 | Dorris et al. | 239/265.17 |

(Continued)

FOREIGN PATENT DOCUMENTS

EP          1 191 214 A2    3/2002

(Continued)

OTHER PUBLICATIONS

EP Search Report, EP04252523, Sep. 30, 2004.

*Primary Examiner*—Timothy D Collins
(74) *Attorney, Agent, or Firm*—Penny A. Clarke

(57) ABSTRACT

A system for jet engine noise control of a jet engine having a main jet stream exiting an exhaust nozzle and flowing along a jet axis includes a thermal acoustic shield directed at a non-zero angle relative to the jet axis. The thermal acoustic shield may be configurable about the main jet stream. The system may further include at least a fluidic chevron injected at a location relative to the nozzle exit for enhancing mixing in the main jet stream and creating a non-circular jet stream.

8 Claims, 7 Drawing Sheets

VG Jet at Nozzle lip (External)

VG Jet at Nozzle inner wall

U.S. PATENT DOCUMENTS

| | | |
|---|---|---|
| 6,360,528 B1 | 3/2002 | Brausch et al. ............... 60/262 |
| 6,502,383 B1 | 1/2003 | Janardan et al. ............ 60/226.1 |
| 6,571,549 B1 * | 6/2003 | Stanek ........................ 60/262 |
| 6,705,547 B2 * | 3/2004 | Braga Da Costa Campos ................. 239/265.33 |
| 6,786,038 B2 * | 9/2004 | Lair ........................... 60/226.1 |
| 6,962,044 B1 * | 11/2005 | Miller et al. .................. 60/230 |
| 2002/0189896 A1 * | 12/2002 | Tse ............................ 181/213 |

FOREIGN PATENT DOCUMENTS

| | | |
|---|---|---|
| EP | 0702141 | 5/2002 |
| FR | 1436412 | 12/1966 |
| GB | 2207468 | 2/1989 |
| WO | WO 02/29232 A1 | 4/2002 |

* cited by examiner

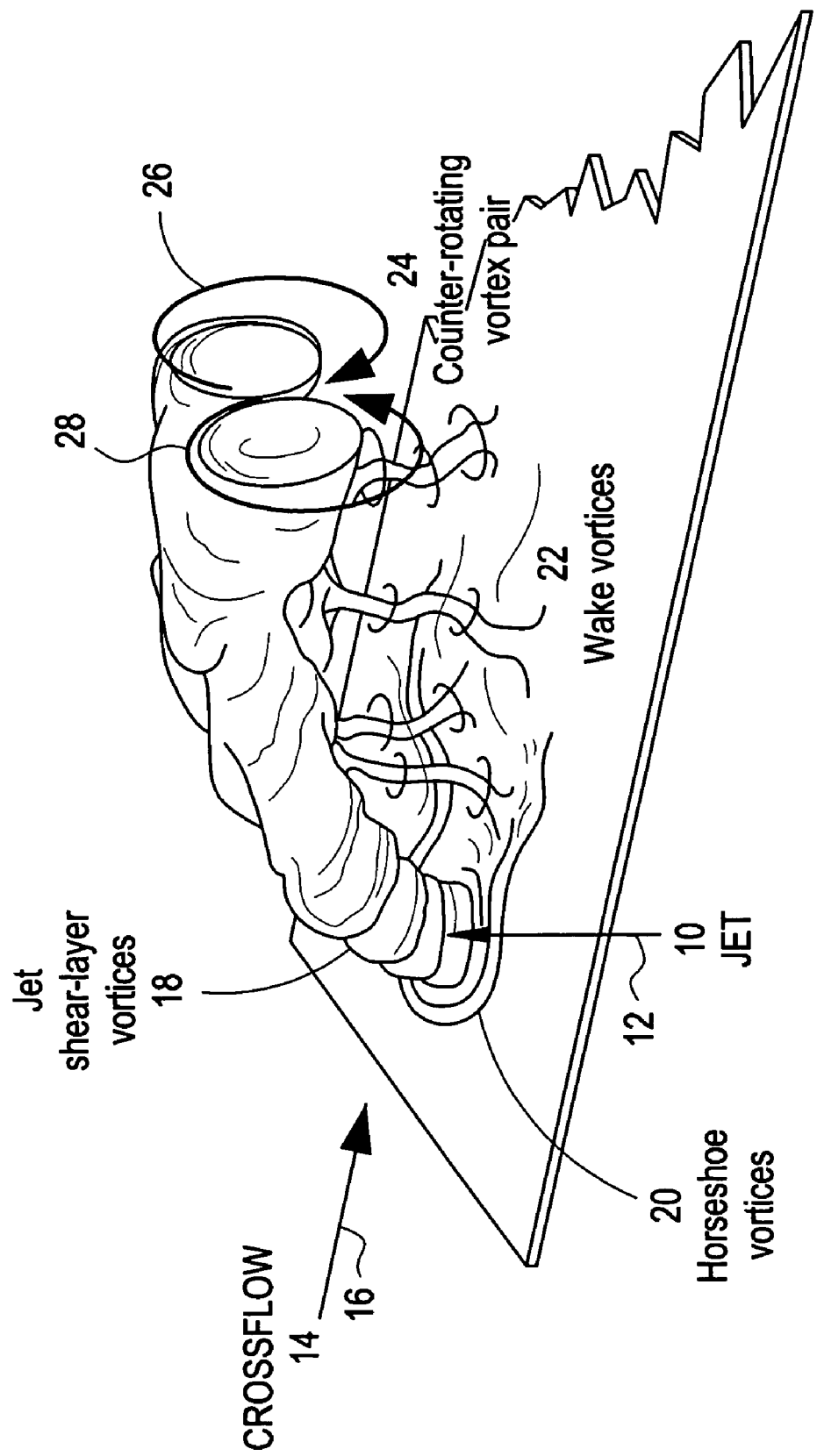

VG Jet at Nozzle lip (internal)

VG Jet at Nozzle lip (External)

VG Jet at Nozzle inner wall

FIG. 5
Flyover noise reduction
FIG. 6
Lateral noise reduction
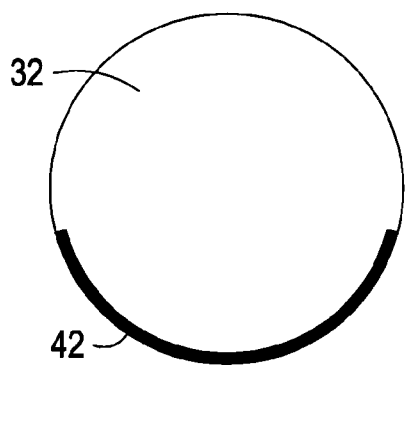
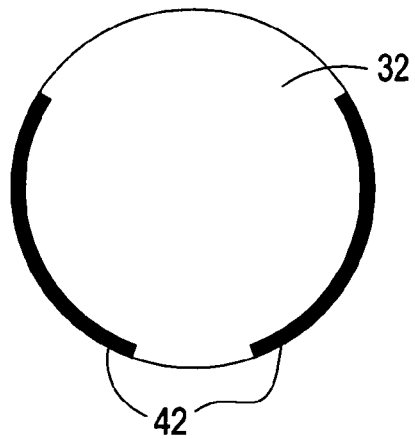
FIG. 7
Thermal Acoustic Shield (TAS) deployed on an annular jet
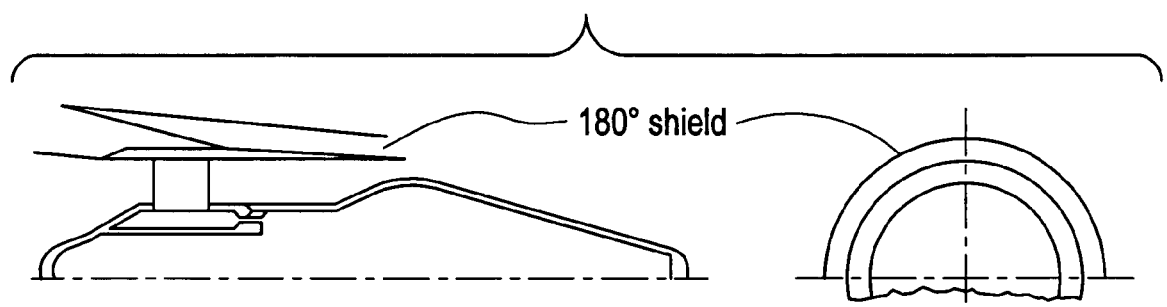

Frequen

250

Noise Reduction due to TAS- Annular Plug Nozzle

Noise Reduction due to TAS- "Chute" Nozzle

FLUIDIC CHEVRONS AND CONFIGURABLE THERMAL SHIELD FOR JET NOISE REDUCTION

STATEMENT REGARDING FEDERALLY SPONSORED RESEARCH AND DEVELOPMENT

The U.S. Government may have certain rights in this invention pursuant to contract number N00014-03-C-0267 awarded by the Office of Naval Research, Navy.

BACKGROUND OF THE INVENTION

This invention relates generally to a method and system for reducing jet noise, and, more particularly, this invention relates to a method and system for jet noise reduction which can be selectively employed during noise sensitive portions of flight.

Exhaust jet noise is a major concern given the increasing demands on aircraft engines to reduce community noise levels. Jet engines produce reaction thrust by ejecting a high velocity stream of gas rearward from the exhaust nozzle or tail pipe of the engine. One of the problems of airplanes equipped with jet engines is that the exhaust stream creates a very high level of sound energy or "noise" in a wide range of frequencies, and a portion of this noise reaches the ground from low flying airplanes, as during takeoff and climb, at an energy level which is not acceptable to the public.

Mechanical chevrons are used in commercial engines to enhance mixing in the exhaust jet shear layer and reduce jet noise. Mechanical chevrons, however, have the disadvantage that they introduce losses in the engine cycle which persist for the entire duration of the flight beyond the noise-sensitive portions of the flight such as landing and take-off.

BRIEF SUMMARY OF THE INVENTION

The above discussed and other drawbacks and deficiencies are overcome or alleviated by a system for jet engine noise control of a jet engine having a main jet stream exiting a nozzle exit and flowing along a jet axis. The system includes a thermal acoustic shield directed at a non-zero angle relative to the jet axis.

In another embodiment, the system includes a thermal acoustic shield configurable about the main jet stream.

In another embodiment, the system includes fluidic chevrons injected at a location relative to the nozzle exit for enhancing mixing in the main jet stream and creating a non-circular jet stream and a thermal acoustic shield directed at a proper angle to the jet axis for selective noise reduction.

The above discussed and other features and advantages of the present invention will be appreciated and understood by those skilled in the art from the following detailed description and drawings.

BRIEF DESCRIPTION OF THE DRAWINGS

FIG. 1 shows a perspective view of a jet in crossflow;

FIG. 5 shows a front plan diagrammatic view of a thermal acoustic shield about a main jet stream configured for flyover noise reduction;

FIG. 6 shows a front plan diagrammatic view of a thermal acoustic shield about a main jet stream configured for lateral noise reduction;

FIG. 7 shows a thermal acoustic shield;

DETAILED DESCRIPTION OF THE INVENTION

Figure 3:
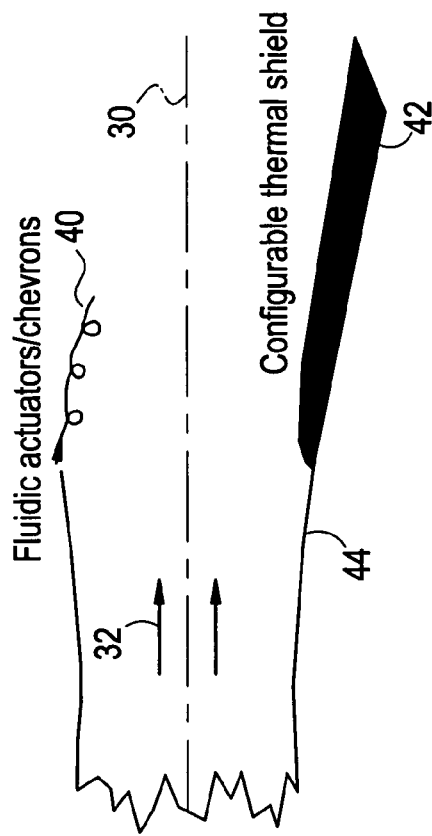
FIG. 3 shows a side plan diagrammatic view of fluidic chevrons and a configurable thermal shield employed adjacent a jet engine nozzle.

A system for jet noise reduction includes the synergistic use of fluidic vortex generators (fluidic chevrons) and a configurable thermal shield to reduce exhaust jet noise. Fluidic chevrons are used to enhance mixing in the jet shear layer and break up large scale structures which contribute significantly to the perceived noise level. A thermal shield is used both to attenuate and reflect noise above a certain frequency threshold. The shield is preferably configurable to reduce noise in specific directions at different stages of the flight mission.

Turning now to FIG. 1, a jet 10 flowing along direction 12 is injected into a crossflow 14 moving in direction 16 which is, by example, shown to be approximately perpendicular to the direction 12 of jet 10. The outcome of the interaction between jet 10 and crossflow 14 may include several vortical structures including jet shear layer vortices 18, horseshoe vortices 20, and wake vortices 22, where a vortex is defined as a fluid element having a whirling or circular motion relative to the main flow. Also, the interaction between jet 10 and crossflow 14 generates a counter rotating vortex pair 24 which is steered by the crossflow in a direction close to the crossflow direction 16. The counter rotating vortex pair 24 may assist in enhancing mixing between the jet 10 and the crossflow 14.

Figure 2:
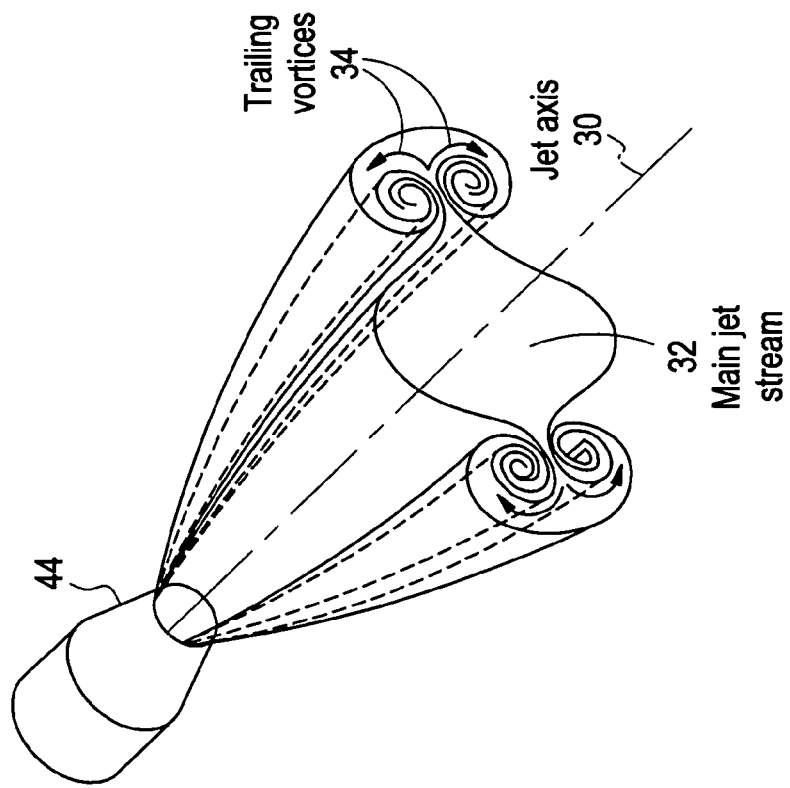
FIG. 2 shows a perspective view of trailing vortices in a main jet stream created by fluidic chevrons.

The jet 10 may be a steady or pulsed vortex generator jet ("PVGJ"). The jet 10, or plurality of jets 10, are injected around an aircraft engine exhaust nozzle for mixing enhancement in the exhaust main flow and jet noise reduction, as will be further described. Jets 10 as described create the chevron effect fluidically rather than mechanically. These jets, injected adjacent a jet engine nozzle 44, generate streamwise vortices which enhance mixing in the main exhaust flow. FIG. 2 illustrates the streamwise vortices generated by the injection of jets 10 in the main exhaust flow. The trailing vortices 34 correspond to the counter rotating vortex pair 24 of FIG. 1.

Figure 4A:
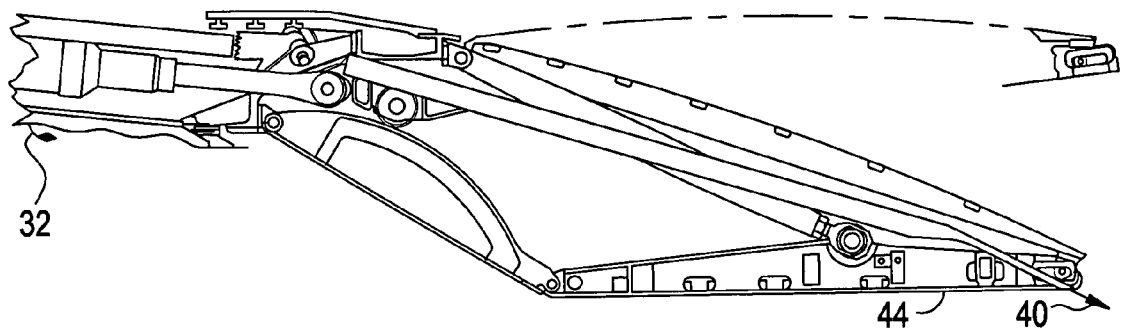
FIGS. 4A-4C shows side plan diagrammatic views of an engine exhaust nozzle with injection port locations.
Figure 4B:
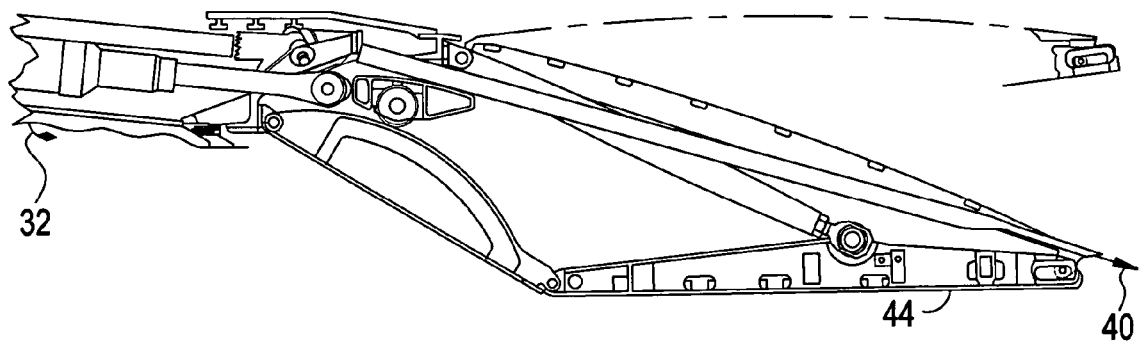
Figure 4C:
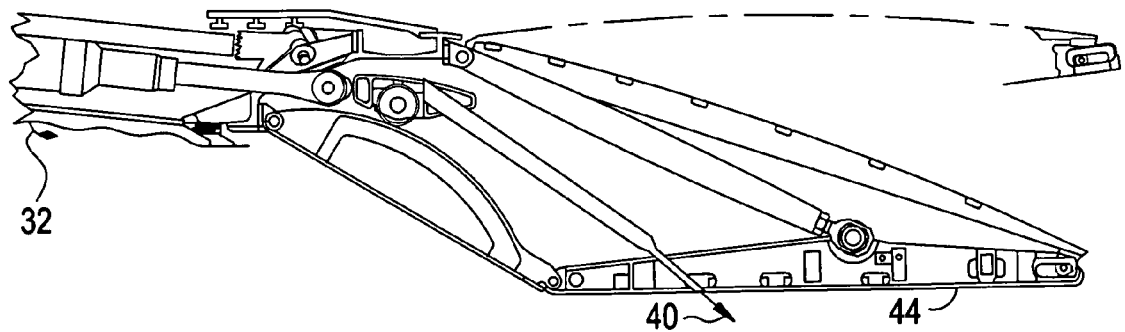

The fluidic chevrons 40 (which comprise of jets 10), also diagrammatically depicted in FIG. 3, may include small steady/pulsed vortex generator jets injected into the main jet shear layer at a proper angle relative to the exhaust jet axis. The injection angle may vary between 0 and 60 degrees. A number of jets, preferably between 16 and 32, can be placed, equally spaced, around the jet exit outer diameter. Also, as indicated in FIGS. 4A-4C, the injection ports of the vortex generator jet ("VGJ") may be located at the exhaust nozzle lip (internally and/or externally) and/or at the exhaust nozzle inner wall upstream from the nozzle exit. The fluidic chevrons 40 are capable of enhancing mixing through the shear layer of jet 32 by introducing streamwise vorticity. This feature of the fluidic chevrons 40 can induce a significant reduction in perceived noise.

Fluidic chevrons 40 may further be used to produce a number of different jet engine configurations at different stages of the mission for maximum overall noise reduction benefits. For example, non-uniform deployment of the fluidic chevrons around the jet engine nozzle yields non-circular exhaust jet configurations, for maximum sideline benefit during take-off roll and climb out.

Also shown in FIG. 3 is a configurable thermal shield 42 created adjacent the jet engine nozzle 44. The thermal acoustic shield 42 is a thin layer of flow that partially surrounds the main jet 32 and is characterized by a proper combination of velocity and speed of sound. The Mach number of the shield flow is below the main jet Mach number and may be between 0.2 and 1.1, and preferably ranges from 0.4 to 0.9 and the speed of sound in the shield flow may range from 1.0 to 2.5 times the speed of sound in the ambient atmosphere, and preferably ranges from 1.25 times to twice the speed of sound in the ambient atmosphere. It should be understood that although preferred ranges are provided, alternate values outside of the ranges may be acceptable if other relevant factors are manipulated to produce the desired results. The shield 42 both attenuates and reflects noise above a certain frequency threshold.

As shown in FIGS. 5 and 6, the shield 42 is actuated along partial sections of the jet nozzle exit circumference rather than axisymmetrically so that the radiated sound can be attenuated and reflected in specific directions with minimum deployment of shield mass-flow and minimum impact on the engine performance. The thermal shield 42 can be deployed so as to deflect the noise radiated to the ground, as shown in FIG. 5, or can be deployed to minimize noise radiated towards the engine sideline, as shown in FIG. 6 (configurable thermal shield). The proper shield configuration depends on the stage of the mission. A change in circumferential extent and orientation is accomplished fluidically. A change in the angle of the shield can be realized by a technique for steering a flow using fluidics. In another embodiment, a fixed orientation that is at an acute angle with respect to the main jet axis may be employed.

Turning now to FIG. 7, an exemplary thermal acoustic shield 42 is shown having a 180 degree arc.

Figure 8:
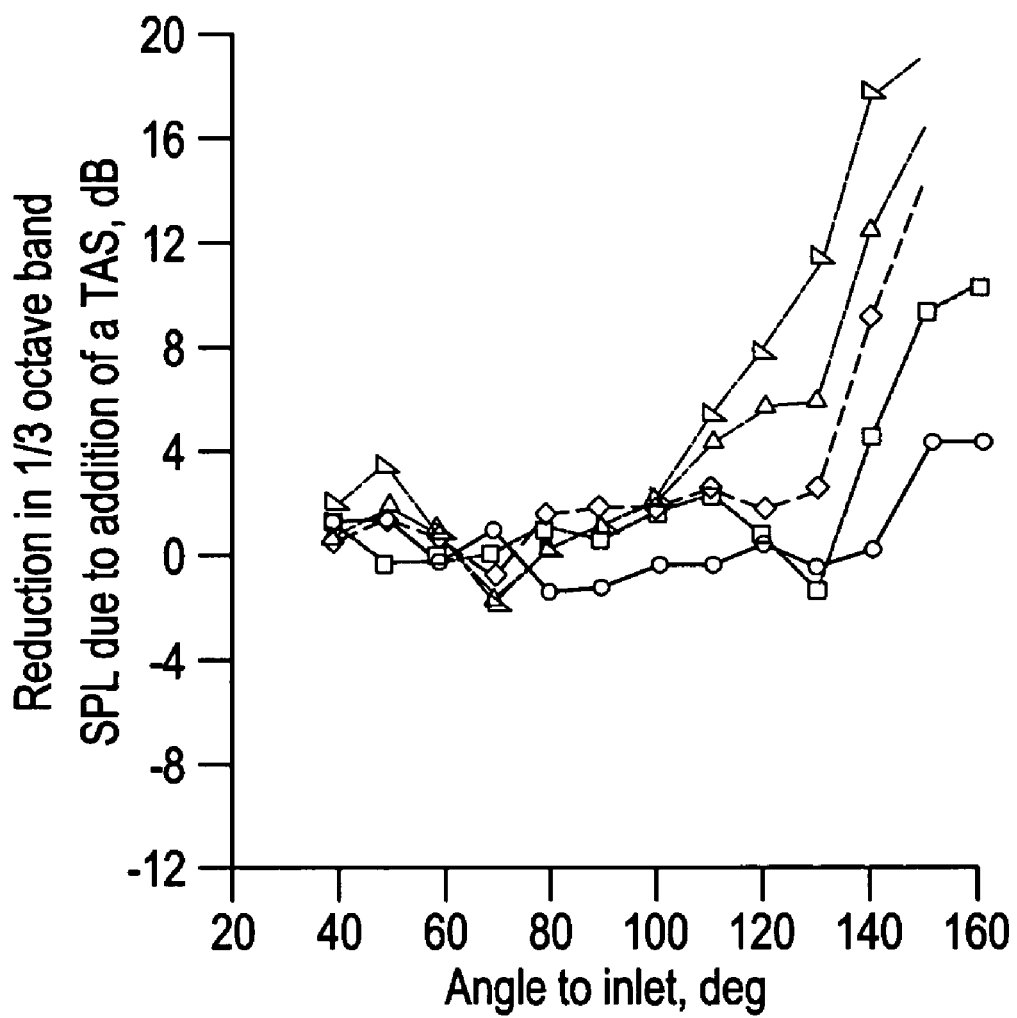
FIG. 8 shows experimental data on the noise reduction (of jet noise) directivity obtained by use of a parallel thermal acoustic shield (TAS) at angles from 40 to 160 degrees to the engine inlet for frequencies from 250 to 4000 Hz.
Figure 9:
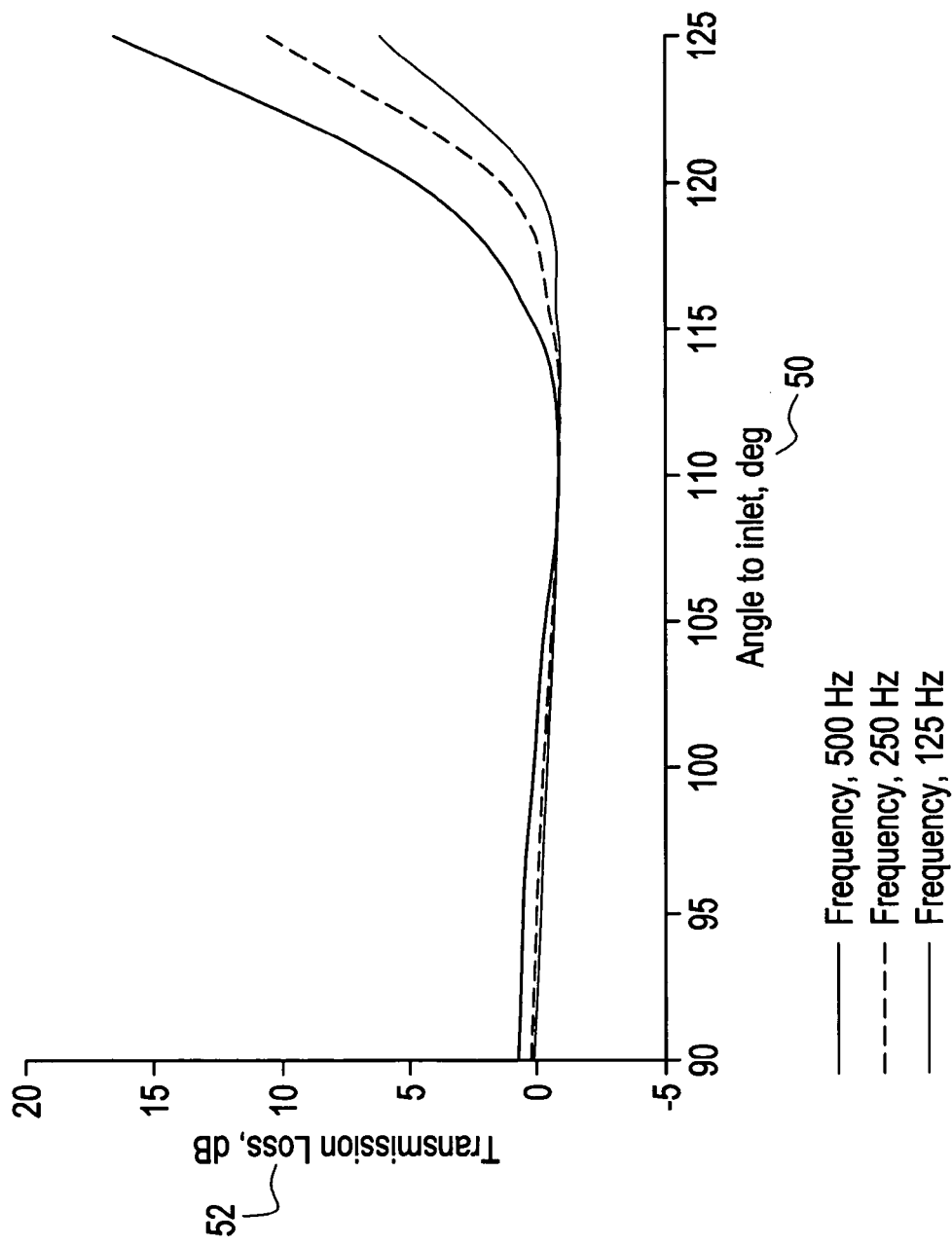
FIG. 9 shows theoretical calculations assessing the transmission loss through a 6" thermal acoustic shield (TAS) which is at about 1000 degrees F. temperature and with Mach number of 0.55 at frequencies from 125 to 500 Hz and at angles to the inlet axis from 90 to 125 degrees.
Figure 10:
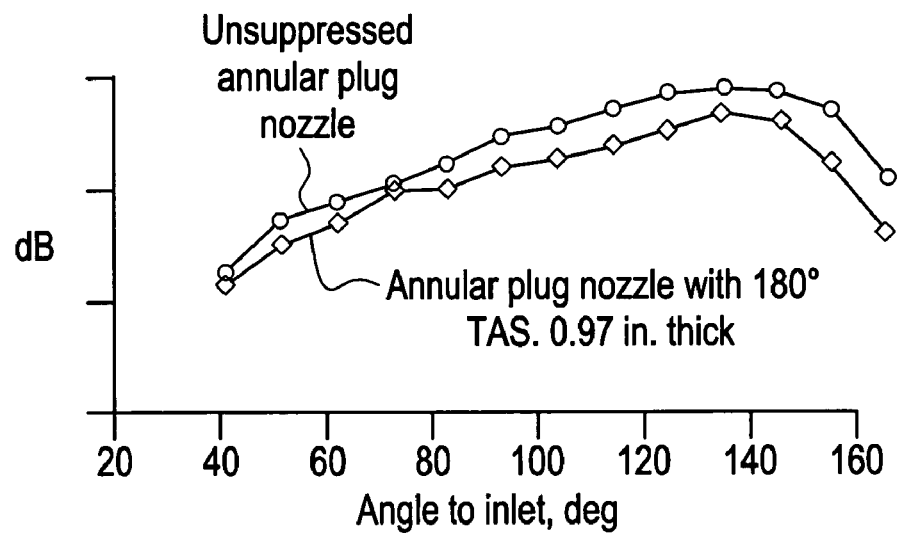
FIG. 10 shows a graph of the perceived noise level (PNL) suppression obtained on an annular plug nozzle jet by use of a TAS as a function of angle from the inlet; and, FIG. 11 shows a graph of the perceived noise level (PNL) suppression obtained on a nozzle equipped with a mechanical suppressor by use of a TAS as a function of angle from the inlet.

FIGS. 8, 9, and 10 together demonstrate how an angled thermal acoustic shield in cooperation with fluidic chevrons is effective in reducing noise and broadening the noise reduction directivity.

FIG. 8 shows the empirically determined variation of the directivity and attenuation in dB of noise of increasing frequency when a thermal acoustic shield is employed that is parallel to the jet axis. The preferred embodiment exploits the higher attenuation at high angles (approaching the jet axis at 180 degrees). By employing the shield at an angle not parallel to the jet axis, the region of high attenuation will shift to lower angles by an amount proportional to the angle of the shield with respect to the jet axis. As the jet engine passes a stationary observer, the noise suppression would then be sensed sooner. Moreover, the attenuation is higher for higher frequency noise. Therefore, the shift to high frequency that naturally appears when using chevrons makes the thermal acoustic shield highly effective.

Turning now to FIG. 9, a graph of decibels of transmission loss 52 versus angle to inlet in degrees 50 is shown. It is shown that the natural attenuation for noise passing through a thermal acoustic shield is a strong function of the angle of the shield axis to the wave propagation direction. Noise radiating perpendicular to the shield is not attenuated but noise radiating at an angle of 30 to 60 degrees with respect to the shield is significantly attenuated. The use then of an angled thermal acoustic shield at roughly 5 to 60 degrees, and more specifically between 15 to 45 degrees from the jet axis (or 135 to 165 degrees to the inlet axis) is shown to improve the attenuation of the noise.

Figure 11:
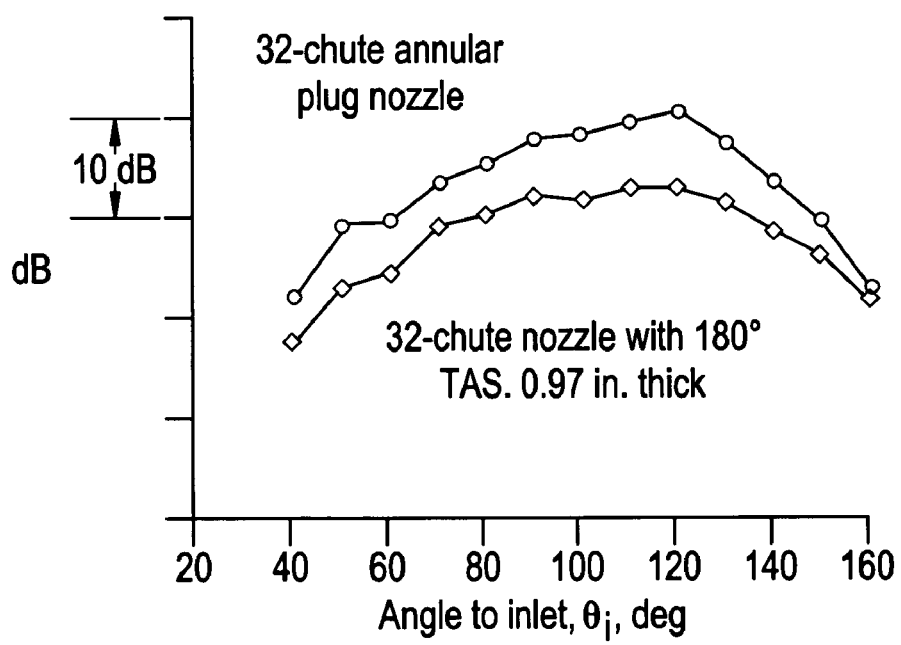

FIGS. 10 and 11 show the influence of the thermal acoustic shield 42 on Perceived Noise Level directivity of unsuppressed annular plug and 32-chute suppressed nozzles at cutback cycle. The result shows the reduction of perceived noise when the thermal acoustic shield is employed alone (FIG. 10). When a 32-chute mixer is employed, which shifts jet noise to higher frequencies like the fluidic chevrons do, the parallel thermal acoustic shield performs significantly better (FIG. 11) for all angles from the jet axis (zero being the flight direction). Only in the core of the jet directly behind the engine is the TAS not effective in reducing noise. The graphs show that the noise peaks at angles between 120 and 130 degrees to inlet.

Relative to mechanical systems, such as mechanical chevrons, the proposed fluidic technology has the advantage that it can be activated on demand to reduce jet noise and can be used to produce a number of different exhaust jet configurations at different stages of the mission for maximum overall noise reduction benefits. Reconfiguration of the shield 42 can be utilized to reduce sideline noise during a take-off roll (FIG. 6) then reoriented to reduce downward noise (FIG. 5) as the aircraft crosses the airport boundary. Unlike mechanical systems, the fluidic system limits additional engine cycle impact to the noise-sensitive portions of the flight such as take-off and landing without affecting engine performance for the remainder of the flight.

Fluidic chevrons 40 and the configurable thermal acoustic shield 42 can be activated on demand during the noise-sensitive portions of the flight such as terminal operations in which take-off, climb-out, preparation for landing, and landing, place the aircraft over noise sensitive areas and then turned off for the remainder of the flight. This feature minimizes the impact of the noise reduction technology on the engine cycle and limits any adverse efficiency impact to take-off and landing operations.

Thus, the synergistic use of on-demand fluidic chevrons 40 and thermal acoustic shield 42 for jet noise reduction has been described. The fluidic chevrons reduce noise levels and shift the remaining noise energy to higher frequencies. The thermal acoustic shield when directed at an angle to the jet axis improves the directivity of noise reduction and attenuates effectively the high frequency noise. The combination, therefore, significantly improves the overall noise level than when each element is used independently. Further, the use of fluidic technology enables a number of optimal jet engine configurations for maximum noise reduction and minimum engine cycle penalty at different stages of the mission and in different environments.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for jet engine noise control of a jet engine having a main jet stream exiting a nozzle exit and flowing along a jet axis, the system comprising:
   a plurality of vortex generator jets configured to inject a plurality of jets of fluid at reconfigurable locations relative to the nozzle exit during different stages of a mission for creating a non-circular jet stream.

2. The system of claim 1 comprising between 16 and 32 vortex generator jets.

3. The system of claim 1 wherein at least one jet of fluid is injected at an angle between 0 and 60 degrees relative to the jet axis.

4. The system of claim 1 wherein the nozzle exit has a lip and at least one jet of fluid is injected internally of the nozzle lip.

5. The system of claim 1 wherein the nozzle exit has a lip and at least one jet of fluid is injected externally of the nozzle lip.

6. The system of claim 1 wherein at least one jet of fluid is injected upstream from the nozzle exit.

7. The system of claim 1 wherein at least one jet of fluid is injected at a non-parallel angle to the jet axis.

8. The system of claim 1 wherein at least one jet of fluid is injected during take-off and landing of a flight and is not injected during all other portions of the flight.

* * * * *